US012436199B2

(12) United States Patent
Jin et al.

(10) Patent No.: US 12,436,199 B2
(45) Date of Patent: Oct. 7, 2025

(54) SYSTEM AND METHOD OF PREDICTING BATTERY STATE OF HEALTH

(71) Applicant: Cummins Inc., Columbus, IN (US)

(72) Inventors: Xing Jin, Columbus, IN (US); Ninad Ghike, Columbus, IN (US); Ruigang Zhang, Columbus, IN (US); Anant Puri, Columbus, IN (US); Richard A. Booth, Columbus, IN (US)

(73) Assignee: Cummins Inc., Columbus, IN (US)

( * ) Notice: Subject to any disclaimer, the term of this patent is extended or adjusted under 35 U.S.C. 154(b) by 267 days.

(21) Appl. No.: 18/096,707

(22) Filed: Jan. 13, 2023

(65) Prior Publication Data

US 2023/0288489 A1  Sep. 14, 2023

Related U.S. Application Data

(60) Provisional application No. 63/304,516, filed on Jan. 28, 2022.

(51) Int. Cl.
| | |
|---|---|
| *G01R 31/00* | (2006.01) |
| *B60L 3/12* | (2006.01) |
| *G01R 31/367* | (2019.01) |
| *G01R 31/392* | (2019.01) |
| *G01R 31/396* | (2019.01) |

(52) U.S. Cl.
CPC .............. *G01R 31/392* (2019.01); *B60L 3/12* (2013.01); *G01R 31/007* (2013.01); *G01R 31/367* (2019.01); *G01R 31/396* (2019.01)

(58) Field of Classification Search
CPC .............................. G01R 31/396; G01R 31/392
See application file for complete search history.

(56) References Cited

U.S. PATENT DOCUMENTS

| | | | |
|---|---|---|---|
| 10,197,631 B2 | 2/2019 | Barfield, Jr. et al. | |
| 2007/0029974 A1 | 2/2007 | Uchida | |
| 2011/0040440 A1* | 2/2011 | de Oliveira | G06Q 10/0631 |
| | | | 701/29.5 |
| 2013/0268150 A1 | 10/2013 | Weslati | |
| 2014/0217976 A1* | 8/2014 | McGrath | B60L 15/2045 |
| | | | 320/109 |
| 2017/0169342 A1 | 6/2017 | Waltinger | |
| 2019/0001836 A1* | 1/2019 | Payne | B60W 20/13 |

(Continued)

FOREIGN PATENT DOCUMENTS

| | | |
|---|---|---|
| CN | 111999657 A | 11/2020 |
| WO | 2021014406 A1 | 1/2021 |

*Primary Examiner* — Jess Whittington
(74) *Attorney, Agent, or Firm* — Faegre Drinker Biddle & Reath LLP (57) ABSTRACT

A system and method used to predict the state of health of a battery in a powertrain of a vehicle including a vehicle route profile generator arranged to generate a vehicle specific rout profile based on historical vehicle driving information, are disclosed. In one example, the system and method also include a powertrain model to convert the vehicle specific route profile to a predicted battery demand profile, and a state of health profile generator to generate a predicted state of health profile of the battery based on the predicted battery demand. In another example, the system further includes a vehicle performance manager arranged to generate a command to modify operation of the powertrain to extend battery life based on the vehicle specific route profile.

15 Claims, 8 Drawing Sheets

(56) References Cited

U.S. PATENT DOCUMENTS

| | | |
|---|---|---|
| 2019/0176639 A1 | 6/2019 | Kumar et al. |
| 2020/0207218 A1* | 7/2020 | Lavertu ..................... B61C 7/04 |
| 2021/0181762 A1* | 6/2021 | Zhao ....................... G05D 1/227 |
| 2021/0229568 A1* | 7/2021 | Herring .................... G06N 5/04 |
| 2022/0115897 A1* | 4/2022 | Ijaz ...................... H01M 10/441 |
| 2023/0115083 A1* | 4/2023 | Slutzky ................... B60L 53/14 |
| | | 320/109 |

* cited by examiner

SYSTEM AND METHOD OF PREDICTING BATTERY STATE OF HEALTH

CROSS-REFERENCE TO RELATED APPLICATIONS

The present application claims priority to U.S. Provisional Application Ser. No. 63/304,516, entitled "PREDICTING BATTERY STATE OF HEALTH," filed on Jan. 28, 2022, the entire disclosure of which being expressly incorporated herein by reference.

FIELD OF THE DISCLOSURE

The present disclosure relates to techniques for predicting the state of health of a battery and for extending battery life in an electric or hybrid electric vehicle.

BACKGROUND

Electric vehicles and hybrid electric vehicles, such as cars, buses, vans and trucks, use batteries that are designed with a high ampere-hour capacity in order to give power over sustained periods of time. One or more battery packs may be used, each battery pack comprising a large number of individual electrochemical cells connected in series and parallel to achieve the total voltage and current requirements. Typically, Lithium ion (Li-ion) battery cells are used as they provide a relatively good cycle life and energy density.

Batteries for electric vehicle applications degrade during use due to the arduous duty cycles that are usually encountered. When the batteries no longer meet electric vehicle performance standards they need to be replaced. Typically, particularly for fleets of vehicles, a battery replacement or servicing date is scheduled in advance. However, the useful life of a battery pack will depend on how the vehicle is driven. Therefore, there is a risk that on one hand a battery may be replaced or serviced sooner than necessary, or on the other hand that the battery could fail while in service. Battery failure could result in significant warranty cost and downtime cost to the operator.

It is known to monitor the state of health (SOH) of a battery pack, in order to assist an operator in organising maintenance and replacement schedules. The SOH is a figure of merit that indicates the level of battery degradation. The SOH can be used to estimate when the battery will reach end of life. However, the actual end of life may still vary depending on factors such as how, where and how often the vehicle is driven.

It would therefore be desirable to provide techniques for reliably predicting when the replacement time for a battery will occur. For example, it may be desirable to provide an alert a certain amount of time before the battery reaches its end of life to allow the option of performing a scheduled downtime and/or to provide a prediction of future SOH. It would also be desirable to provide techniques which can help extend the end of life of a battery in a vehicle, or the batteries in a fleet of vehicles.

SUMMARY

According to one aspect of the disclosure there is provided a system for predicting a state of health of a battery in a powertrain of a vehicle, the system comprising:

a vehicle route profile generator arranged to generate a vehicle specific route profile based on historical vehicle driving information;

a powertrain model arranged to convert the vehicle specific route profile to a predicted battery demand profile; and a state of health profile generator arranged to generate a predicted state of health profile of the battery based on the predicted battery demand profile.

The present disclosure may provide the advantage that, by generating a vehicle specific route profile based on historical vehicle driving information and using this to produce a predicted state of health profile of the battery, it may be possible to predict future state of health more accurately. This can allow an advance warning of potential battery failure to be provided and can assist with the scheduling of vehicle downtime.

The state of health may be any appropriate measure of battery degradation. For example, in one embodiment, the state of health is a measurement of the remaining capacity of the battery as percentage of its original capacity. Thus, the state of health may represent the ability of the battery to store energy and deliver power relative to its beginning of life (BOL).

The system may further comprise a database which stores the historical vehicle driving information. This can allow vehicle driving information to be collected and accumulated over time to form the historical vehicle driving information.

The system may comprise a communications module arranged to receive vehicle driving information from the vehicle and to store the vehicle driving information in the database. Thus, the system may be remote from the vehicle, and may be for example part of a centralized fleet management system.

The predicted state of health profile may be transmitted to the vehicle and/or another entity such as an operations manager and/or a servicing center. The predicted state of health profile may be displayed on a display and/or used to help schedule vehicle downtime.

The system may be arranged to receive new vehicle driving information at intervals over time (e.g. periodically) and to store the new vehicle driving information in the database. Thus, the system may be arranged to build up the historic driving information over time.

In one embodiment, the vehicle is a vehicle in a fleet of vehicles and the system is arranged to receive vehicle driving information from a plurality of vehicles in the fleet of vehicles. This can allow historic driving information from a plurality of vehicles to be built up.

The historical vehicle driving information may comprise at least one of: vehicle speed; environmental data (such as temperature, pressure, precipitation etc); traffic data (such as traffic jams, roadworks etc); road grade data; charging data (such as rate and/or frequency of charging); state of charge data; state of health data; vehicle driver information (such as driver ID); and any other appropriate data concerning past vehicle driving conditions.

The vehicle route profile generator may be arranged to generate the vehicle specific route profile based further on predicted vehicle driving information. The predicted vehicle driving information may comprise, for example: predicted environmental data (such as temperature, pressure, precipitation etc); predicted traffic data (such as traffic jams, roadworks etc); predicted driver; predicted routes; and any other data concerning future vehicle driving conditions which can be predicted in advance.

The vehicle route profile generator may comprise a model or an algorithm arranged to generate the vehicle specific route profile based on the historical vehicle driving information. For example, the vehicle route profile generator may comprise a clustering algorithm or a statistical model such as a stochastic model. In one embodiment, a Markov chain based algorithm is used to generate the vehicle specific route profile from the historical vehicle driving information, although any other suitable algorithm could be used instead.

The system may comprise a battery model arranged to produce an estimate of the remaining useful life of the battery based on the predicted battery demand profile. In this case, the state of health profile generator may be arranged to generate the predicted state of health profile based on the estimate of the remaining useful life of the battery from the battery model. In some examples, a plurality of estimates of the remaining useful life of the battery is produced, and the predicted state of health profile is generated based on the plurality of estimates.

The battery model may comprise a system-to-cell converter arranged to convert the battery demand profile to a cell-level operating profile, and a remaining useful life estimator arranged to produce the estimate of the remaining useful life of the battery based on the cell-level operating profile. In some examples, at least one of the estimate of the remaining useful life of the battery and the cell-level operating profile is used to update the powertrain model. This may help to increase the accuracy of the powertrain model over time.

In one embodiment, the system further comprises a vehicle performance manager arranged to manage performance of the vehicle based on the predicted state of health profile. The vehicle performance manager may be arranged to generate a command to modify an operation of the vehicle based on the predicted state of health profile. For example, the vehicle performance manager may be arranged to modify at least one of a powertrain performance characteristic and a charging characteristic of the vehicle. This may allow battery life to be extended by predictively adapting powertrain and/or charging performance based on historical vehicle driving information.

The vehicle performance manager may be arranged to issue a command to the vehicle to modify a powertrain performance characteristic of the vehicle in dependence on the predicted state of health profile. For example, the powertrain management module may be arranged to determine when the battery is close to end of life (for example, when a time until a predicted end of life is less than a predetermined threshold) and to issue the powertrain performance command when it is determined that the battery is close to end of life. The powertrain performance characteristic may comprise at least one of: dynamic vehicle acceleration management; limiting acceleration when vehicle speed is above a threshold; limiting maximum speed; limiting charging power during regenerative energy recovery; limiting accessories power consumption; and any other appropriate characteristic which may cause the powertrain to place less demand on the battery. Thus, the powertrain management module may be arranged to predictively adapt the vehicle's powertrain performance based on the historical vehicle driving information. This can allow battery life to be extended as the battery is reaching end of life.

The vehicle performance manager may be arranged to issue a command to the vehicle to modify a charging characteristic of the battery in dependence on the predicted state of health profile. The charging characteristic may comprise at least one of: limiting a charging rate of the battery; limiting a maximum state of charge of the battery; limiting fast charging of the battery; and another other appropriate characteristic which may reduce battery degradation during charging. Thus, the charging management module may be arranged to predictively adapt the charging of the battery based on the historical vehicle driving information. This can allow battery life to be extended as the battery is reaching end of life.

At a fleet level, fleet operation may be optimized by scheduling vehicles with batteries that are close to end of life to have a more favorable driving characterization profile. This may allow the fleet to extend the life of the batteries and perform scheduled downtimes. This may be achieved by checking the predicted state of health profiles of a plurality of batteries in the fleet and prioritizing and optimizing vehicle operation according to the predicted state of health profiles.

Thus, the vehicle may be a vehicle in a fleet of vehicles and the system may further comprise a fleet scheduling module arranged to generate fleet scheduling commands based on a predicted state of health profile for each of a plurality of vehicles in the fleet. The fleet scheduling module may be arranged to compare the predicted state of health profiles for the plurality of vehicles in the fleet and to determine which vehicles have more severely aged batteries in comparison to other vehicles in the fleet. The scheduling commands may comprise at least one of: prioritize vehicles with less severely aged batteries; schedule vehicles with more severely aged batteries to avoid operating under harsh ambient conditions (for example, at noon or early in the afternoon when high temperatures accelerate the aging); schedule vehicles with more severely aged batteries to avoid operating on demanding routes (for example, routes with a large number of hills or long distances), and schedule vehicles with severely aged batteries to avoid operating with heavy loads.

In one embodiment, the state of health profile generator is arranged to receive a battery capacity measurement from the vehicle and to extrapolate a state of health of the battery based on the received battery capacity measurement. The battery capacity measurement may be extrapolated over a predetermined time window. This may allow the predicted state of health profile to be based partially on actual capacity measurements. This may help to provide a reliable and computationally efficient method of predicting battery remaining useful life.

The system may further comprise an alarm generator for generating an alarm if the extrapolated state of health or the predicted state of health profile decreases below a predetermined threshold over a predetermined time window. The alarm may indicate that the battery is expected to reach end of life within a predetermined time window. This can allow a vehicle operator and/or a servicing center to schedule a vehicle downtime.

The system may instruct the vehicle to obtain the battery capacity measurement by performing a slow charge. This may help to ensure that an accurate battery capacity measurement is obtained.

In the case where the system comprises a battery model, the battery model may be updated based on the received battery capacity measurement. This may allow the accuracy of the battery model to be improved.

According to another aspect of the disclosure there is provided a system for predicting a state of health of a battery in a powertrain of a vehicle, the system comprising:
    means for generating a vehicle specific route profile based on historical vehicle driving information;

means for converting the vehicle specific route profile to a predicted battery demand profile; and means for generating a predicted state of health profile of the battery based on the predicted battery demand profile.

According to another aspect of the disclosure there is provided a system for managing a battery in a powertrain of a vehicle, the system comprising:

a vehicle route profile generator arranged to generate a vehicle specific route profile based on historical vehicle driving information; and a vehicle performance manager arranged to generate a command to predictively modify operation of the powertrain to extend battery life based on the vehicle specific route profile.

According to another aspect of the disclosure there is provided a fleet management system for managing a fleet of vehicles, the fleet management system comprising:

a database which stores historical vehicle driving information of a plurality of vehicles in the fleet of vehicles;

a vehicle route profile generator arranged to generate a vehicle specific route profile based on historical vehicle driving information;

a powertrain model arranged to convert the vehicle specific route profile to a predicted battery demand profile;

a state of health profile generator arranged to generate a predicted state of health profile of a battery of a vehicle in the fleet of vehicles based on the predicted battery demand profile; and a fleet scheduling module arranged to generate fleet scheduling commands based on a predicted state of health profile for each of a plurality of vehicles in the fleet.

The scheduling commands may comprise at least one of: prioritize vehicles with less severely aged batteries; schedule vehicles with more severely aged batteries to avoid operating under harsh ambient conditions (for example, at noon or early in the afternoon when high temperatures accelerate the aging); schedule vehicles with more severely aged batteries to avoid operating on demanding routes (for example, routes with a large number of hills or long distances), and schedule vehicles with severely aged batteries to avoid operating with heavy loads.

Corresponding methods may also be provided. Thus, according to another aspect of the disclosure there is provided a method of predicting a state of health of a battery in the powertrain of a vehicle, the method comprising:

using historical vehicle driving information to generate a vehicle specific route profile;

converting the vehicle specific route profile to a predicted battery demand profile using a powertrain model; and generating a predicted state of health profile of the battery based on the predicted battery demand profile.

The method may further comprise managing performance of the vehicle based on the predicted state of health profile. For example, the method may comprise modifying at least one of a powertrain performance characteristics and a charging characteristic of the vehicle. The method may further comprise scheduling vehicles in a fleet based on a predicted state of health profile for each of a plurality of vehicles in the fleet. The scheduling may comprise at least one of: prioritize vehicles with less severely aged batteries; schedule vehicles with more severely aged batteries to avoid operating under harsh ambient conditions (for example, at noon or early in the afternoon when high temperatures accelerate the aging); schedule vehicles with more severely aged batteries to avoid operating on demanding routes (for example, routes with a large number of hills or long distances), and schedule vehicles with severely aged batteries to avoid operating with heavy loads.

Features of one aspect of the disclosure may be used with any other aspect. Any of the apparatus features may be provided as method features and vice versa.

BRIEF DESCRIPTION OF THE DRAWINGS

The features of the present disclosure according to some examples or embodiments will now be described, purely by way of example, with reference to the accompanying drawings, in which.

DETAILED DESCRIPTION

Figure 1:
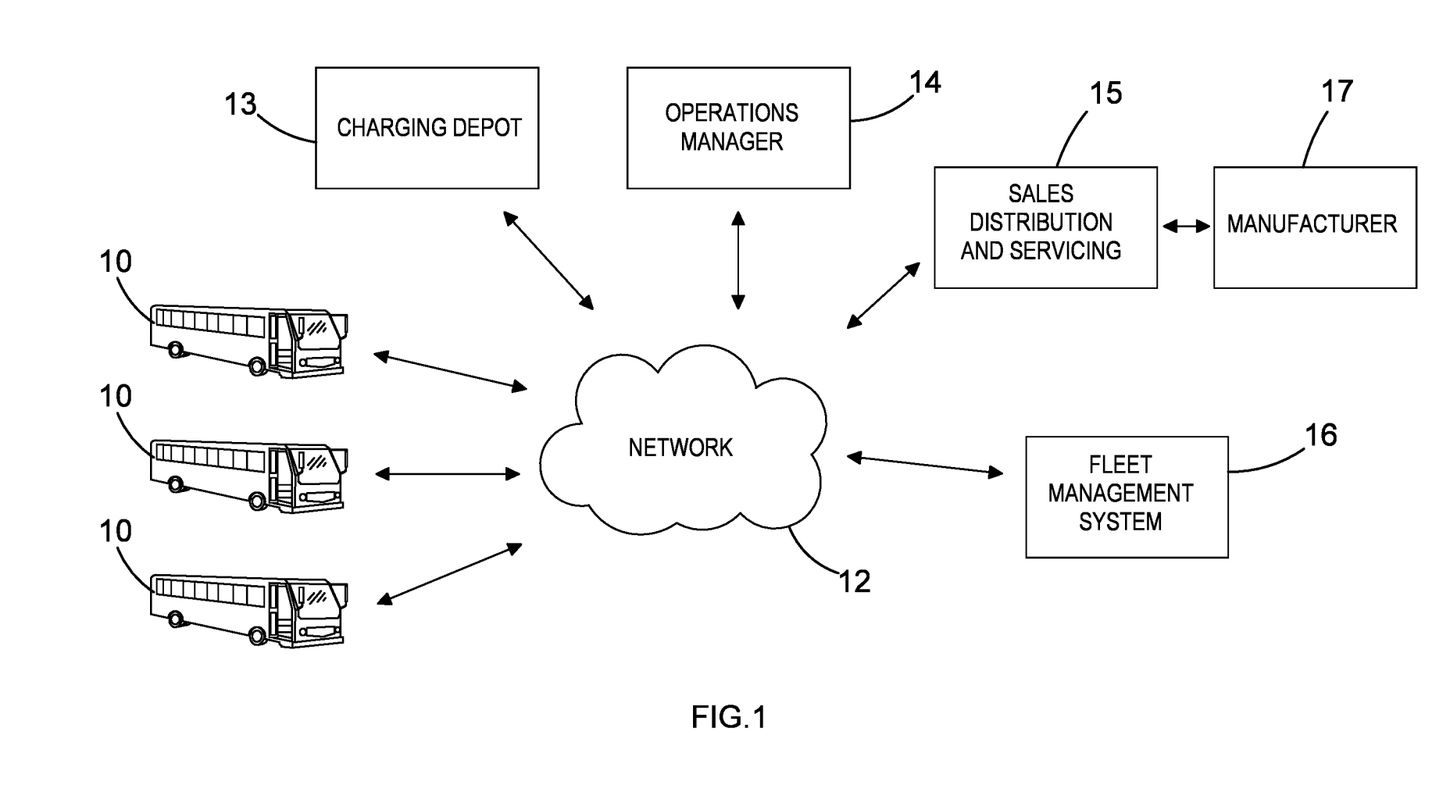
FIG. 1 shows parts of an electric vehicle fleet architecture.

FIG. 1 shows parts of an electric vehicle fleet architecture in one example embodiment. Referring to FIG. 1, the system comprises a plurality of electric vehicles 10, a network 12, one or more charging depots 13, an operations manager 14, a sales, distribution and servicing center 15 and a fleet management system 16. Each electric vehicle 10 may be an electric or hybrid electric vehicle, and may comprise a traction motor powered by one or more battery packs. Each vehicle 10 is arranged to communicate with one or more other entities in the architecture via the network 12. The network 12 may be any type of network, such as a local network, a wide area network, the Internet, a cellular network or any other appropriate type of network, and may use wired and/or wireless transmission, such as radio frequency (RF) transmission. The charging depot 13 comprises one or more charging stations for charging the vehicles, for example, from an electrical grid. The operations manager 14 comprises a data processor and is responsible for scheduling routes for the vehicles in the fleet. The sales, distribution and servicing center 15 comprises a data processor, and allows sales, distribution and servicing staff to communicate with users of the fleet, for example, to coordinate servicing and replacement of components. The sales, distribution and servicing center 15 is in communication with battery manufacturer 17. The fleet management system 16 manages overall operation of the fleet. This may include monitoring vehicle performance, and controlling operation of one or more of the vehicles 10, charging depot 13 and operations manager 14. The charging depot 13, operations manager 14, sales, distribution and servicing center 15 and fleet management system 16 are arranged to communicate with other entities in the fleet architecture via the network 12. The charging depot 13, operations manager 14, sales, distribution and servicing center 15 and/or fleet management system 16 may be at the same location, at different locations, or distributed amongst a number of different locations.

Figure 2:
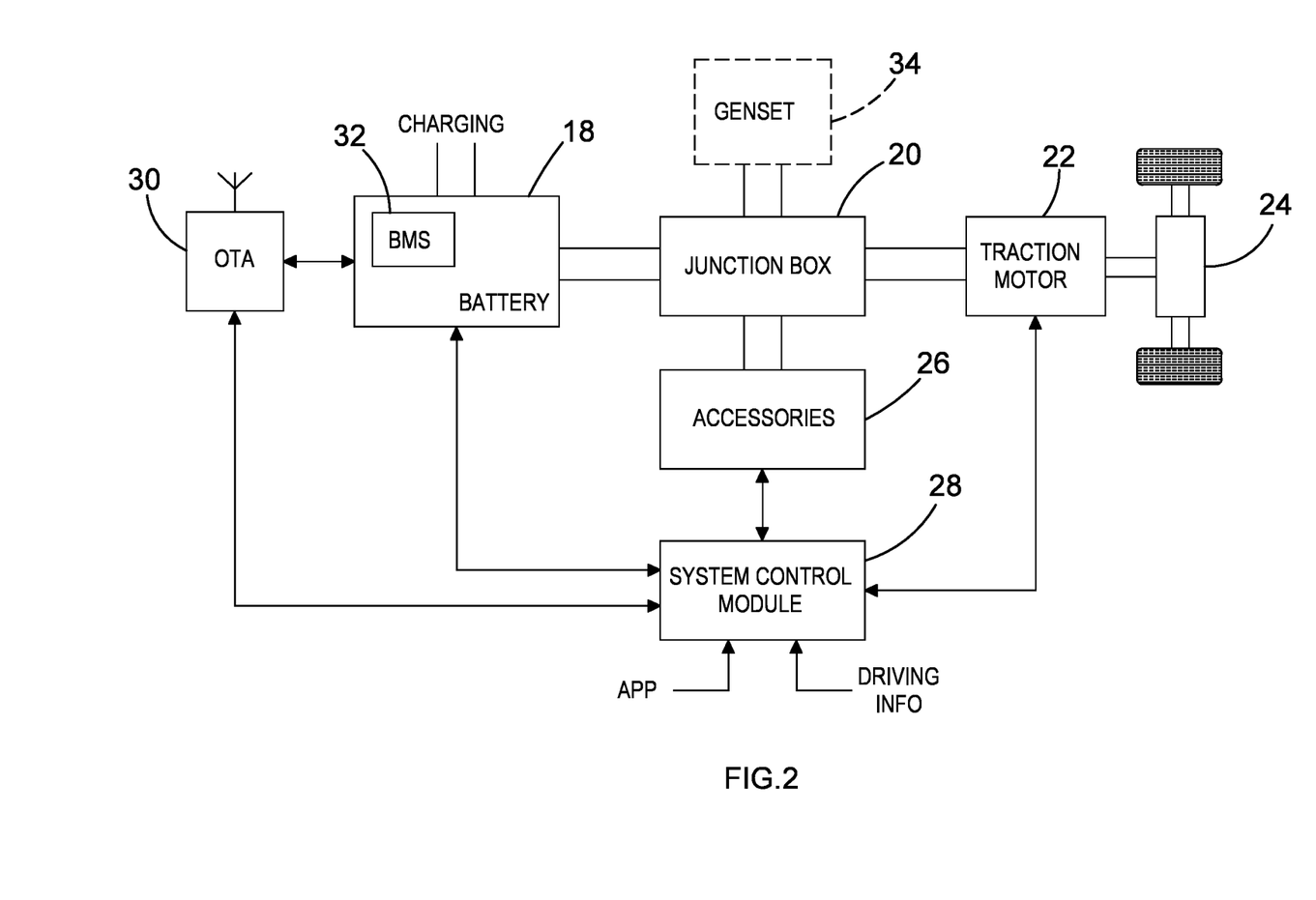
FIG. 2 shows parts of an exemplary powertrain system for an electric vehicle.

FIG. 2 shows parts of an exemplary powertrain system for an electric vehicle. Referring to FIG. 2, the powertrain system comprises battery 18, junction box 20, traction motor 22, vehicle drivetrain 24, electrical accessories 26, system control module (SCM) 28 and over-the-air module 30. The battery 18 is electrically connected to the traction motor 22 and the electrical accessories 26 via the junction box 20. The traction motor 22 is mechanically connected to the vehicle drivetrain 24. The vehicle drivetrain 24 typically comprises a drive shaft and a differential connected to driven wheels, in a manner known in the art. The electrical accessories 26 may comprise components such as a heater, DC/DC converter, power steering inverter, compressor, fan, etc.

In use, the traction motor 22 is used to supply mechanical power to the vehicle drivetrain 24. Electrical power for the traction motor 22 is supplied from the battery 18. The battery may comprise one or more battery packs and is charged from an external power source. The battery 18 includes a battery management system (BMS) 32 which is used to monitor and manage charge and discharge of the battery. The powertrain may be purely electric, in which case power is provided solely by the battery. However, a generator set (genset) 34 may be provided to generate power and charge the battery when needed. In this case, the powertrain may be a series hybrid powertrain. Alternatively, it would be possible for the powertrain to be a parallel hybrid powertrain. In all cases, the traction motor may supply power to the battery during regenerative braking.

The system control module (SCM) 28 is used to perform overall system control. The system control module 28 receives an accelerator pedal position (APP) signal and uses this to generate torque commands for the traction motor 22. The system control module 28 may also collect driving information relating to the vehicle. The vehicle driving information comprises data such as vehicle speed, acceleration, weather, traffic, road grade, charging rates, SOC, SOH etc., which may be collected by other onboard components and/or received via a communications channel. The OTA module 30 allows the system to communicate with external systems, for example using radio frequency (RF) transmission.

Batteries for electric vehicle applications tend to degrade during use due to the arduous duty cycles that are usually encountered. When a battery no longer meets electric vehicle performance standards it may need to be replaced. Typically, a battery replacement or servicing date is scheduled in advance. The battery's SOH may also be monitored to assist with organising maintenance and replacement schedules. However, the useful life of a battery will depend on how the vehicle is driven. Therefore, there is a risk that on one hand a battery may be replaced or serviced sooner than necessary, or on the other hand that the battery could fail while in service. Battery failure could result in significant warranty cost and downtime cost to the operator. It would therefore be desirable to provide an alert a certain amount of time before the battery reaches its end of life to allow the option of performing a scheduled downtime.

In embodiments of the present disclosure, user specific drive cycles/route profiles are generated for each user and/or vehicle in the fleet. The user specific route profiles are generated based on historic driving data and are used to predict battery degradation. The predicted battery degradation can used to schedule downtime for serving and/or replacement of the battery pack.

Fleet Management System

Figure 3:
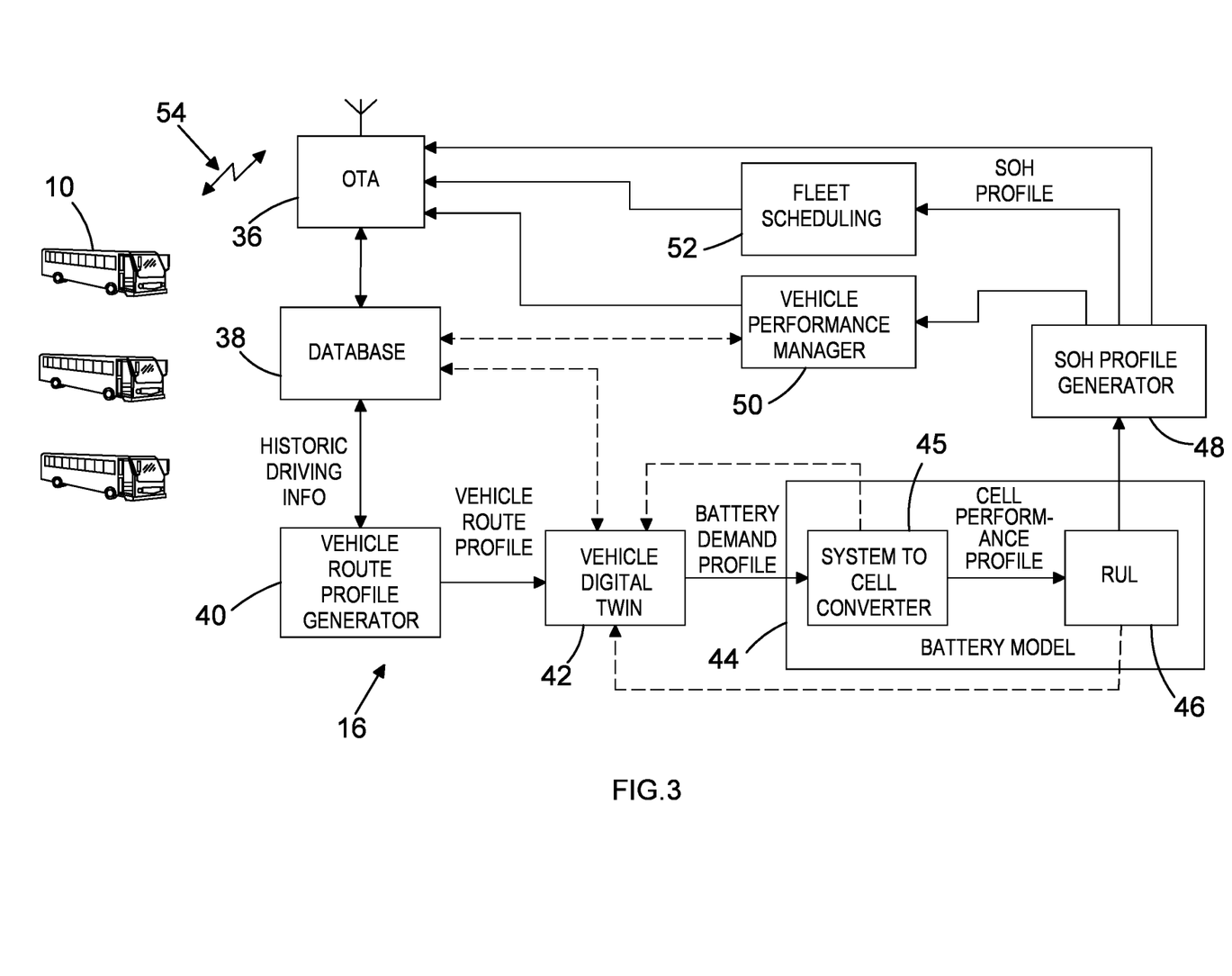
FIG. 3 shows parts of a fleet management system in an embodiment of the disclosure.

FIG. 3 shows parts of a fleet management system in an embodiment of the disclosure. Referring to FIG. 3, the system 16 comprises over-the-air module 36, database 38, vehicle route profile generator 40, vehicle digital twin 42, battery model 44, SOH profile generator 48, vehicle performance manager 50 and fleet scheduling module 52. The database 38 comprises one or more storage devices arranged to store data, and a database management system (DBMS) arranged to manage the data, such systems being known in the art. The battery model 44 comprises system-to-cell converter 45 and remaining useful life (RUL) estimator 46. The vehicle route profile generator 40, vehicle digital twin 42, battery model 44, SOH profile generator 48, vehicle performance manager 50 and fleet scheduling module 52 may be implemented, for example, as software modules running on a processor. The OTA module 36 allows the system 16 to communicate with vehicles 10 in a fleet of vehicles via a communications link 54, which may be for example a radio frequency (RF) link or any other type of communications link.

In operation, each of the vehicles 10 is arranged to collect driving information relating to that vehicle. The vehicle driving information may comprise data such as vehicle speed, weather, traffic, road grade, charging, SOC, SOH etc. The vehicle driving information is collected over a CAN (Controller Area Network) bus by a telematics device or may be read from ECM (Engine Control Module) memory directly. The telematics device consolidates the data and transmits it over the communications link 54 to the fleet management system 16.

The over-the-air module 36 in the fleet management system 16 is used to receive vehicle driving information from each of the vehicles 10 in the fleet. The received vehicle driving information is stored in the database 38. The database 38 is continually updated with new vehicle driving information. This allows the database 38 to build up historic records of driving information for the vehicles in the fleet. The historical data can be accessed from the database by database queries.

The vehicle route profile generator 40 is used to generate a route profile for individual vehicles. The vehicle route profile is a predicted profile of how that vehicle will be driven over a predetermined period of time in the future. The vehicle route profile is generated based on historic driving information for that vehicle and other vehicles stored in the database 38. Predicted route characteristics, such as weather forecasts and traffic forecasts, may also be used. Techniques for generating the vehicle route profile include: clustering algorithms, for example based on GPS, road grade and/or velocity information; Markov chain based algorithms; and machine learning algorithms such as generative adversarial networks. These algorithms may be implemented using a suitably programmed processor. The vehicle route profile may indicate, for example, predicted operating times, predicted operating conditions, and predicted rest times for the vehicle.

The vehicle digital twin 42 is a model of how the battery demand for the vehicle will vary in dependence on the vehicle route profile. The vehicle digital twin 42 receives a vehicle route profile from the vehicle route profile generator 40 and coverts it into a battery demand profile. The battery demand profile is a predicted profile of the demands that will be placed on the battery over a predetermined period of time. For example, the battery demand profile may be a predicted profile of battery current and/or power request with respect to time. The vehicle digital twin 42 uses a model of the vehicle powertrain to produce the battery demand profile from the vehicle route profile. The power train model may include physics based transfer equations for the powertrain, and machine learning (ML) models. In one embodiment, the model is a semi-empirical model using a combination of physics equations and data tables. The model may be implemented using a suitably programmed processor. The output of the vehicle digital twin 42 is a battery demand profile which comprises predictive battery duty cycle information based on factors such as future weather, traffic, route, and usage information.

The system-to-cell converter 45 receives the battery demand profile from the vehicle digital twin 42, and coverts it to a cell-level operating profile. This conversion is carried out because the vehicle digital twin operates at a system (vehicle) level, whereas the RUL estimator 46 operates at the level of the battery cells. The system-to-cell converter 45 uses a model of the battery system which relates system level demand power/current to cell level current demand. The model of the battery system may be provided in advance based on laboratory data and/or may be updated during use based on data received from the vehicle's battery management system. Where the battery system comprises a plurality of battery packs, the conversion is carried out for each battery pack. As indicated by the dashed line in FIG. 3, values from the system-to-cell converter 45 can be fed back to the battery digital twin 42 to help improve the accuracy of the modelling. In one embodiment, the output of the system to cell converter 45 is a cell level state of charge (SOC) cycle for the vehicle over the predetermined period of time. However, the output of the system to cell converter 45 could comprise other cyclic information such as current against time, voltage against time and/or temperature against time as well or instead.

The remaining useful life (RUL) estimator 46 receives the cell level cyclic information (such as the state of charge cycle) from the system-to-cell converter 45 and uses it to produce estimates of the remaining useful life of the battery. This is achieved using a RUL model which relates the cell level cyclic information to remaining useful life. The RUL model may be a data driven model (for example, a Machine Learning/Regression model). Alternatively, a physics-based model could be used to calculate the RUL. These models may be implemented using a suitably programmed processor. Each RUL estimate is a single data point representing an estimate of the RUL of the battery at a point in time in the future. The RUL estimates are provided to the SOH profile generator 48. As indicated by the dashed line in FIG. 3, the RUL estimates from the RUL estimator 46 can also be fed back to the battery digital twin 42 to help improve the accuracy of the modelling performed by the battery digital twin.

The SOH profile generator 48 uses the RUL estimates to produce an SOH profile. The SOH profile is a trendline of the predicted SOH of the vehicle's battery system. The SOH profile can be produced by fitting a curve to RUL estimates at various different points in the future. Techniques for producing the SOH profile are discussed in more detail below.

Figure 4:
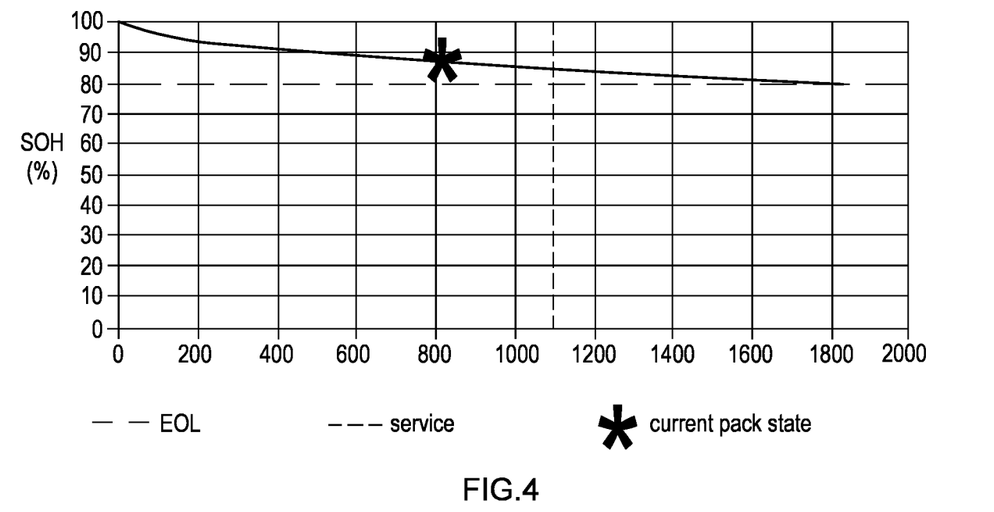
FIG. 4 shows an example SOH profile of a battery.

FIG. 4 shows an example SOH profile of a battery pack. At the start of its life, the SOH of the battery pack is 100%, and this decreases over time as the vehicle is used. In FIG. 4, the current SOH is indicated by the star. The part of the SOH profile before the star is the historic SOH, while the part of the profile after the star is the predict future SOH. In this example, the battery pack is considered to have reached end of useful life when the SOH is at 80% (i.e. the capacity of the battery pack is at 80% of its nominal capacity) as indicated by the horizontal dashed line. However, it will be appreciated that any other appropriate value may be used instead. The nominal servicing time is shown by the vertical dashed line.

As can be seen from FIG. 4, the actual end of life of the battery pack may occur at a different time from the nominal serving time. By predicting the future SOH profile, it may be possible to adjust the time at which the battery pack is serviced so that it is closer to the actual end of life. This may help to avoid, on one hand, the risk of battery failure in service, and on the other hand servicing the battery pack sooner than is necessary.

Referring to FIG. 3, the SOH profile is output from the SOH profile generator 48 and may be for example transmitted to the vehicle 10 via the OTA module 36 for display on the vehicle dashboard. This can allow the driver of the vehicle to see how the SOH of the battery is likely to change in the future. The SOH profile may also be transmitted to the operations manager 14. This can allow the fleet operator to view the SOH profiles for the various vehicles in the fleet, which may assist for example in scheduling routes for the vehicles. The SOH profile may also be transmitted to the sales, distribution and servicing center 15, and may be used to advise users to schedule a service for a battery replacement. The SOH profile can also be used by the battery manufacturer 17 to estimate the number of battery packs that will need to be supplied in order to minimize the level of stock and shelf degradation.

The SOH profile is also provided to the vehicle performance manager 50. The vehicle performance manager 50 is used to modulate vehicle performance and charging features to extend the useful life of the battery.

The fleet management system 16 is used to produce SOH profiles for each vehicle in the fleet (or a subset thereof) based on the vehicle route profile for that vehicle. The SOH profiles of the various vehicles are provided to the fleet scheduling module 52. The fleet scheduling module 52 is used to optimize vehicle scheduling to extend the useful life of the batteries and allow scheduled downtimes to be performed.

Modulating Vehicle Performance

In embodiments of the present disclosure, systems and methods are provided for modulating vehicle performance features to extend battery remaining useful life using customer historical vehicle driving information. Battery replacement may result in significant warranty cost and downtime cost. Therefore, having the capability to extend the battery life can allow users to have increased confidence in the powertrain and reduce warranty costs.

In one embodiment, a driving characterization profile is created for each vehicle/fleet using historical data such that it is characterized into vehicle speed, vehicle acceleration, weather and traffic information clusters. These clusters are correlated to the rate of battery degradation for individual vehicle driving behavior cluster. The clusters are updated periodically to take into account changes in driving patterns or conditions. By looking at the current battery degradation profile, driving characterization profile and predicted battery degradation, the system can make a decision to update the performance feature characteristics.

Figure 5:
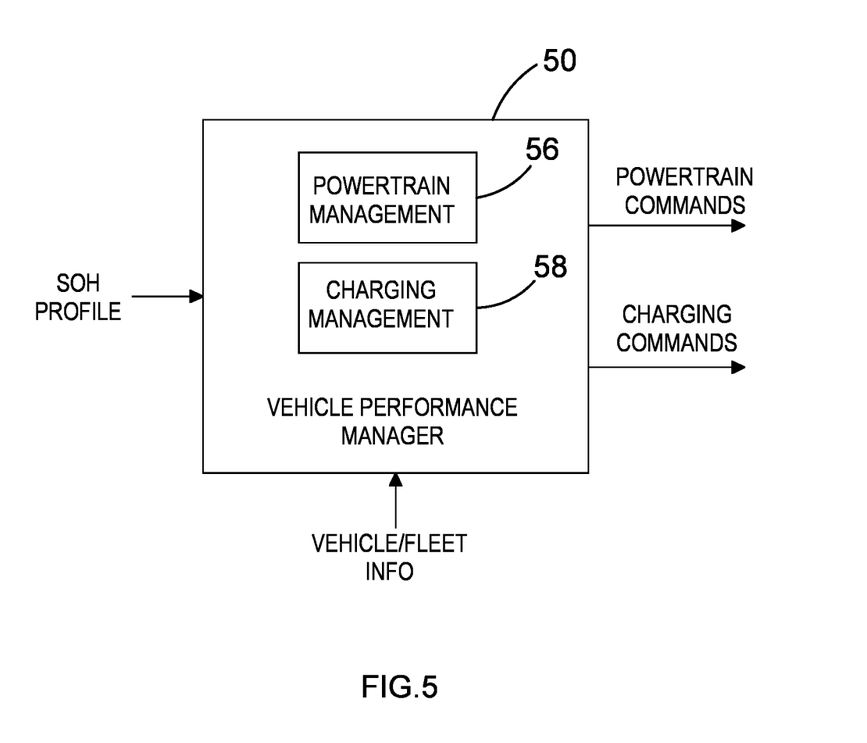
FIG. 5 shows parts of a vehicle performance manager in an embodiment of the disclosure.

FIG. 5 shows parts of a vehicle performance manager in an embodiment of the disclosure. Referring to FIG. 5, the vehicle performance manager 50 comprises a powertrain management module 56 and charging management module 58. The powertrain management module 56 and charging management module 58 may be implemented, for example, as software modules executing on one or more processors.

In operation, the vehicle performance manager 50 receives the predicted SOH profile for each of the vehicles in the fleet. The SOH profile may be generated in the manner described above with reference to FIGS. 3 and 4. The powertrain management module 56 uses the SOH profiles to generate powertrain commands for the vehicles. The charging management module 58 uses the SOH profiles to generate charging commands for the vehicles. The powertrain commands and the charging commands are transmitted via a communications link to the vehicles. The vehicle performance manager 50 may also receive other vehicle and fleet information such as vehicle route profiles and fleet schedules to assist in generating the various commands.

The powertrain management module 56 is arranged to update performance feature characteristics of a vehicle in dependent on the SOH profile for that vehicle. For example, if the SOH profile indicates that the vehicle's battery is likely to reach end of life before the next scheduled service, then the powertrain management module 56 may issue commands to the vehicle's system control module (SCM) instructing it to modify the vehicle's performance to extend the life of the battery. The performance characteristics may include:

Dynamic vehicle acceleration management to limit the capacity loss because of aggressive driving,
Limiting acceleration at higher speeds,
Limiting maximum speed,
Limiting the charging power during regenerative energy recovery to reduce capacity loss, and
Limit accessories power consumption.

Whether or not, and the extent to which, any of the above measures are applied may be varied in dependence on the remaining useful life of the battery and/or the time until the next service.

In some embodiments, the vehicle performance manager 50 is arranged to modify vehicle powertrain performance to help tackle aggressive driving behavior. This can help to avoid faster capacity loss and extend the battery remaining useful life.

Figure 6A:
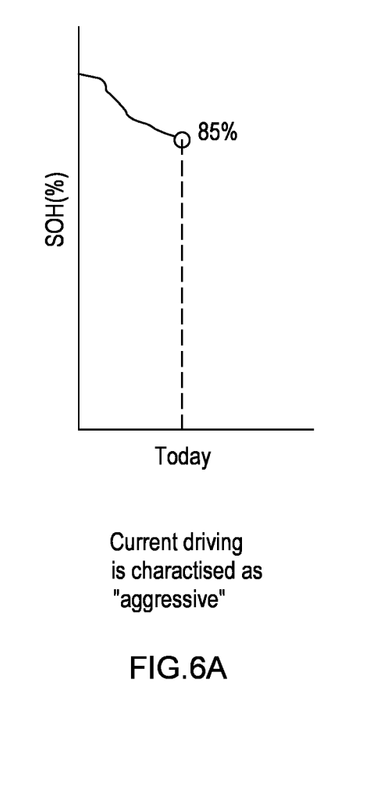
FIGS. 6A to 6C illustrate how driving behavior can affect the life of a battery.
Figure 6B:
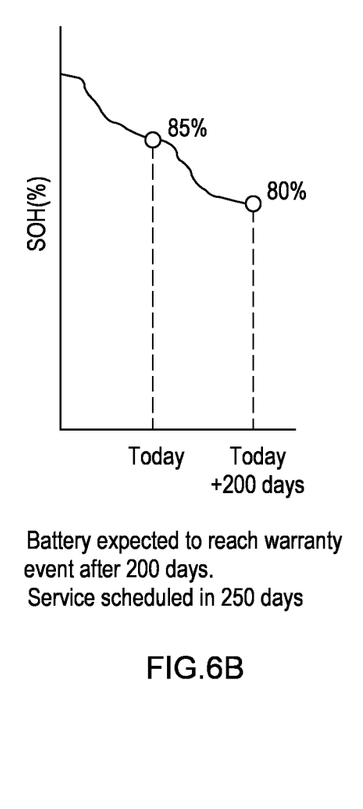
Figure 6C:
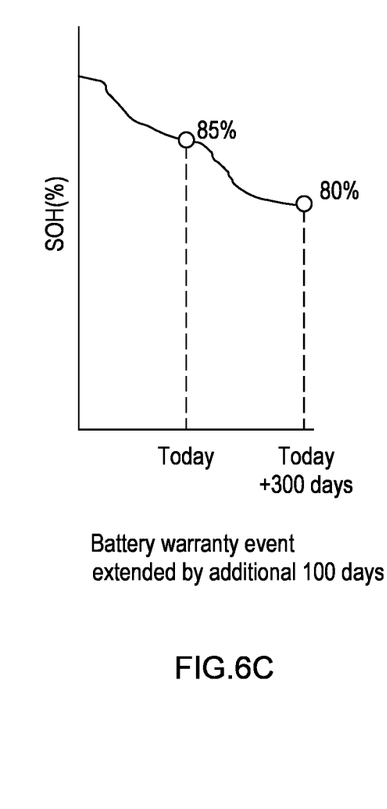

FIGS. 6A to 6C illustrate how driving behavior can affect the life of the battery. In these examples, it is assumed that battery end of life occurs when the SOH reaches 80% of its nominal value, and that a battery servicing is scheduled in 250 days' time. FIG. 6A shows historic SOH against time for a vehicle whose driving has been characterized as "aggressive". In the example shown, the SOH has degraded to 85%. FIG. 6B illustrates the predicted SOH profile for the vehicle assuming that the current driving behavior is maintained. In this example, the battery's SOH is predicted to reach 80% in 200 days' time. However, the battery is only scheduled to be serviced after 250 days. Thus, if the current driving behavior is maintained, it is like to trigger a warranty event after 200 days. FIG. 6C illustrates the predicted SOH if the vehicle powertrain performance is modified to reduce aggressive driving behavior. This may be achieved by limiting the vehicle's acceleration, and/or other modifying other powertrain parameters to limit battery capacity loss. In this example, modifying the vehicle powertrain performance extends the point at which the SOH is predicted to reach 80% to 300 days' time. This is beyond the point at which the battery is scheduled to be serviced, thus avoiding the cost and disruption of a warranty event.

Referring to FIG. 5, the charging management module 58 is arranged to update charging characteristics of a vehicle's battery in dependence on the SOH profile for that vehicle. For example, if the SOH profile indicates that the battery is likely to reach end of life before the next scheduled service, then the charging management module 58 may issue commands to the vehicle's battery management system instructing it to modify the battery's charging characteristics to extend the life of the battery. The charging characteristics may include:

Overnight charging rate management for limiting C-rate to reduce the capacity loss,
SOC management, i.e., only charge the battery to the level of SOC that is sufficient for the usage, to reduce capacity loss,
Limit fast charging when battery approaches its end of life.

Thus, the vehicle performance manager can help to extending battery life by using customer historical data and predictively adapting powertrain and charging performance.

At the fleet level, fleet operation can be optimized by scheduling vehicles with batteries that are close to end of life to have a more favorable driving characterization profile. This can allow the fleet to extend the life of the batteries and perform scheduled downtimes. This is achieved by checking the aging status of the entire fleet (or a subset thereof) and prioritizing and optimizing vehicle operation according to the SOH or remaining useful life of the batteries.

Referring back to FIG. 3, the fleet scheduling module 52 receives the SOH profiles of the various vehicles in the fleet and uses the SOH profiles to determine which vehicles have batteries which are close to end of life. The fleet scheduling module 52 then generates scheduling commands in order to schedule vehicles which are close to end of life to have more favorable driving conditions than those which are further from end of life. For example, the scheduling commands may include:

prioritizing vehicles with less severely aged batteries,
scheduling vehicles with severely aged batteries to avoid operating under harsh ambient conditions (for example, at noon or early in the afternoon when high temperatures accelerate the aging),
scheduling vehicles with severely aged batteries to avoid operating on demanding routes (for example, routes with a large number of hills or long distances), and
scheduling vehicles with severely aged batteries to avoid operating with heavy loads.

The scheduling commands are transmitted to the fleet operations manager 14 for use in scheduling the vehicles in the fleet.

Figure 7:
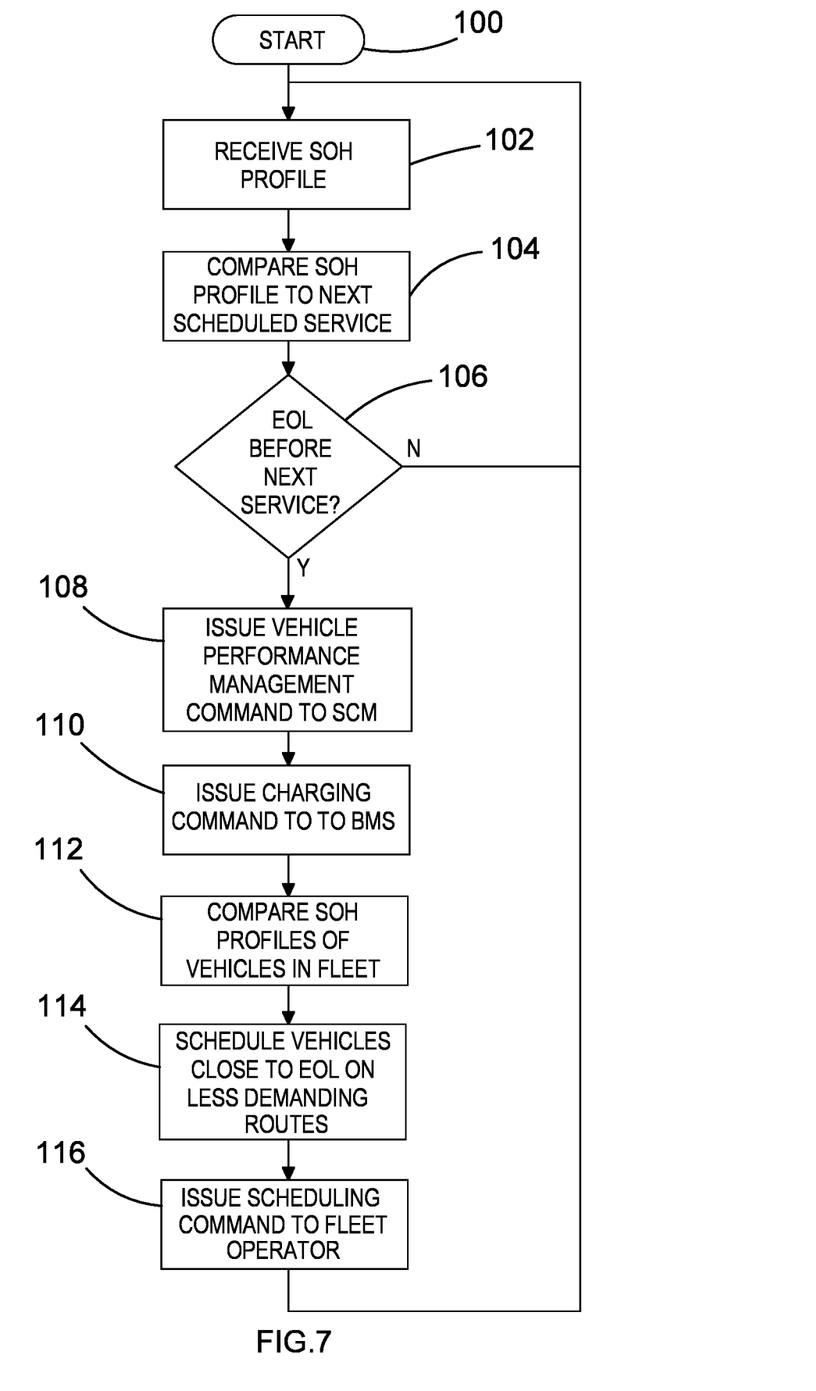
FIG. 7 shows steps taken by a vehicle performance manager and fleet scheduling module in one embodiment.

FIG. 7 shows steps taken by the vehicle performance manager and fleet scheduling module in one embodiment. Referring to FIG. 7, processing starts in step 100. In step 102 the vehicle performance manager receives a SOH profile for a vehicle. The SOH profile may be in the form discussed above with reference to FIGS. 3 and 4. In step 104 the vehicle performance manager compares the SOH profile to the time of the next scheduled service. In step 106 it is determined whether the end of life (EOL) of the battery is before the next scheduled service. This may be the case if the SOH profile is predicted to reach the EOL threshold before the next scheduled service. The EOL threshold may be, for example, when the SOH is at 80% of its nominal value. If the battery is predicted to reach EOL after the next scheduled service (if desired, by an appropriate margin), then processing returns to step 102, and the SOH profile for the next vehicle is received. On the other hand, if the battery is predicted to reach EOL before the next scheduled service, then processing proceeds to step 108. In step 108 the vehicle performance manager issues commands to the vehicle's system control module (SCM) instructing it to modify the vehicle's performance characteristics to extend the life of the battery. The performance characteristics may include dynamic vehicle acceleration management, limiting charging power during regenerative energy recovery, limiting accessories power consumption and/or any other appropriate measures to help extend the battery life. Then in step 110 the vehicle performance manager issues commands to the vehicle's battery management system instructing it to modify the battery's charging characteristics to extend the life of the battery. The charging characteristics may include overnight charging rate management to limit charging rate, SOC management (for example, only charging the battery to the SOC that is sufficient for the scheduled usage), limiting fast charging and/or any other appropriate measures to help extend battery life. The amount by which any of these measures are applied may be varied in dependence on the difference between the time at which the battery is predicted to reach EOL and the time until the next service, the aim being to extend the life of the battery to beyond the next scheduled service, while avoiding measures which are unnecessary.

In step 112 the fleet scheduling module compares the SOH profiles of the vehicles in the fleet. Then in step 114 vehicles with batteries that are close to EOL are scheduled to have more favorable driving conditions than those which are further from EOL. The scheduling may including: prioritizing vehicles with less severely aged batteries; scheduling vehicles with severely aged batteries to avoid operating under harsh ambient conditions (for example, at noon or early in the afternoon when high temperatures accelerate the aging); scheduling vehicles with severely aged batteries to avoid operating on demanding routes (for example, routes with a large number of hills or long distances); and scheduling vehicles with severely aged batteries to avoid operating with heavy loads. Then in step 116 scheduling commands are issued to the fleet operations manager. This can allow the fleet operations manager to schedule vehicles so as to extend the life of the batteries and perform scheduled downtimes at the appropriate times. Processing then returns to step 102, and the SOH profile for the next vehicle is received.

End of Life Prediction

Battery failure may result in significant warranty cost and downtime cost for the supplier and operator. It would therefore be desirable to provide an alert a certain amount of time before the battery will reach its end of life.

In one embodiment of the disclosure, a piecewise linear battery end of life prediction technique is used to predict battery end of life. The intention is to provide an alert a certain number of days or a time window before the battery reaches its end of life. The technique uses different SOH estimation or capacity loss estimation methods to understand the current aging status of the battery and extrapolate the future battery aging status. Capacity loss estimation methods include: slow charging via charger control to measure usable capacity from a certain voltage to a cut off voltage; and model-based capacity loss estimation. Measured capacity loss information can then be used to re-calibrate the model. The remaining useful life (RUL) can then be predicted with the recalibrated model. This can be used to estimate whether the battery is going to reach its end of life in the next time window. Use is made of historic vehicle information (duty cycle, ambient temperature, traffic, weather, etc.) to predict the battery remaining useful life. This may provide a computationally efficient method of predicting battery remaining useful life.

Figure 8:
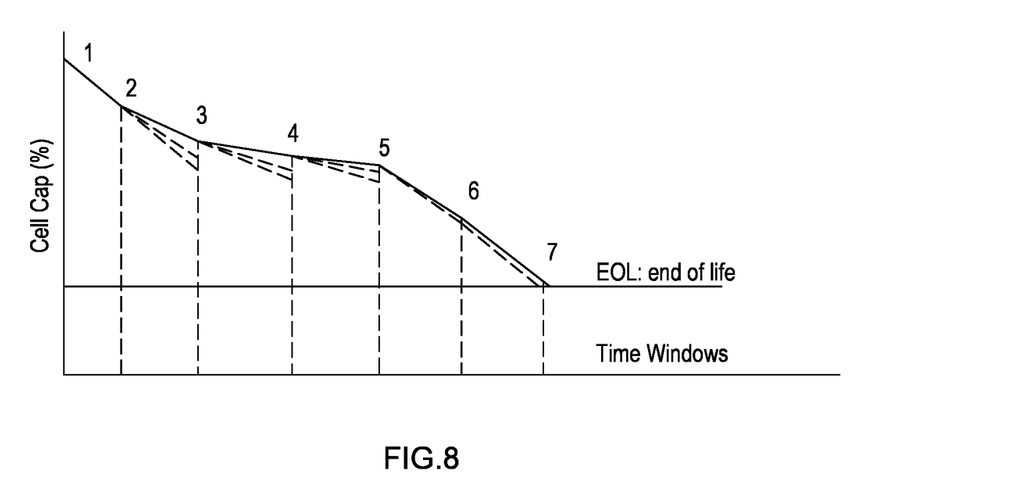
FIG. 8 illustrates the principle of a window-based extrapolation technique.

FIG. 8 illustrates the principle of the window-based extrapolation technique. Referring to FIG. 8, a plurality of time windows of a predetermined length is defined. The time windows can be any appropriate length, and may be for example days, weeks or months (for example, 30, 60 or 90 days or any other appropriate value). At the end of each time window, the remaining capacity is measured. This may be achieved, for example, via slow charging. A piece-wise linear function is then used to predict the capacity for the next time window. This is illustrated by the dashed lines in FIG. 8.

Figure 9:
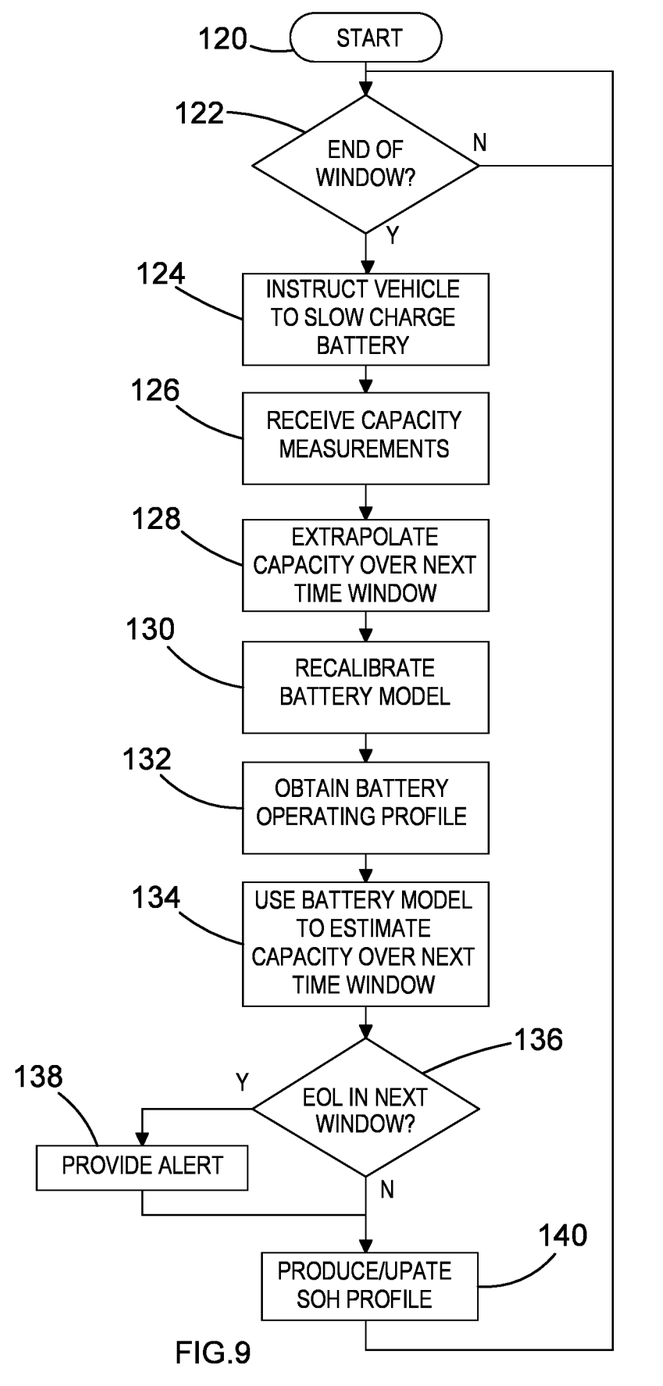
FIG. 9 illustrates steps taken in a remaining useful life prediction method in one embodiment of the disclosure.

FIG. 9 illustrates steps taken in a remaining useful life prediction method in one embodiment of the disclosure. The steps may be performed, for example, by a fleet management system such as that shown in FIG. 3. Referring to FIG. 9, processing starts in step 120. In step 122 it is determined whether or not the end of a time window has been reached. If the end of the time window has been reached, then processing proceeds to step 124. In step 124, the fleet management system instructs the vehicle to perform a slow charge when it is next charged, and to measure the battery capacity during slow charging.

Figure 10:
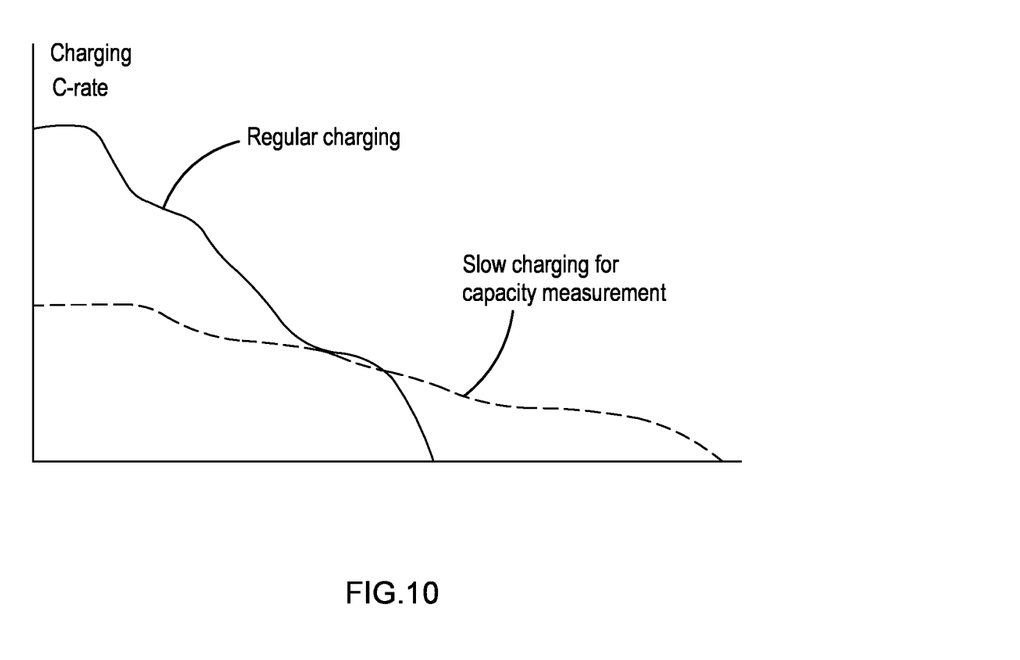
FIG. 10 illustrates the principle of slow charging for capacity measurement.

FIG. 10 illustrates the principle of slow charging for capacity measurement. The charging rate of the battery is typically controlled by the battery management system. By charging the battery at a known current and determining the amount of time it takes for the battery to reach full charge, an estimate of the battery capacity can be obtained. This estimate can then be transmitted from the vehicle to the fleet management system. Slow charging allows time for chemical reactions in the battery to take place, and thus measuring capacity during slow charging provides more accurate results than during fast charging.

Referring back to FIG. 9, in step 126 the fleet management system receives the estimates of usable capacity from the vehicle. This may be achieved, for example, using an over-the-air module such as that shown in FIG. 3. Then in step 128 the system extrapolates the capacity over the next time window. This may be achieved using the two most recent capacity measurements, and preforming a linear extrapolation. This process is illustrated by the dashed lines in FIG. 8. Alternatively, three or more previous capacity measurements may be used, and other extrapolation techniques such as polynomial extrapolation, may be used.

In step 130, the estimates of usable capacity received from the vehicle are used to update a battery model in the fleet management system. The battery model is a model of how the battery capacity changes with battery use. The battery model may comprise a system-to-cell converter and a remaining useful life estimator in the form described above with reference to FIG. 3. By using actual measurements received from the vehicle to update the battery model, the accuracy of the battery model can be increased over time.

In step 132, a battery demand profile is obtained. The battery demand profile is a predicted profile of how the battery will be operated over the next time window. For example, the battery profile may be a predicted profile of battery current with respect to time over the next time window. The battery demand profile may be obtained from a vehicle route profile using a vehicle digital twin in the manner discussed above with reference to FIG. 3.

In step 134 the battery demand profile is used to estimate the battery capacity over the next time window, using the updated battery model. The initial point of the window is the point at which the capacity measurement was taken, and the end point of the window is based on the model prediction. As indicated by the dashed lines in FIG. 8, the estimates produced by the battery model may deviate from the extrapolated capacity determined in step 128. In practice, a range of different estimates may be produced by the battery model, representing a range of different predicting operating conditions for the vehicle.

In step 136 the extrapolated capacity measurements and the various estimates of battery capacity are used to predict whether the battery will reach end of life within the next time window. This may be achieved by determining whether the extrapolated capacity or any of the estimates of battery capacity are such that the battery capacity would be at or below the end of life capacity by the end of the time window. Alternately, it would be possible to look at the distribution of the values and determine whether a certain percentage of the values (for example 5% or 10%) is below the end of life capacity by the end of the time window. If it is determined that the battery will reach end of life within the next time window, then in step 138 an alert is provided that the battery will reach end of life. The operations manager and sales, distribution and servicing center are then advised that the battery should be replaced. Then in step 140 the various estimates of battery capacity are combined and used to produce or update the SOH profile. The SOH profile may then be used in any of the ways discussed above. Processing returns to step 122, and it is determined whether the end of the next time window has been reached.

Some of the features of the disclosure have been described above with reference to various embodiments. Where appropriate, features of one embodiment may be used with any other embodiment. Furthermore, it will be appreciated that the disclosure is not limited to these embodiments, and variations in detail may be made within the scope of the appended claims.

What is claimed is:

1. A system control module configured to modify a vehicle performance to extend the life of a battery based on a predicted state of health profile of the battery from a state of health system, the predicted state of health system comprising:
    a vehicle route profile generator arranged to generate a vehicle specific route profile based on historical vehicle driving information;
    a powertrain model arranged to convert the vehicle specific route profile to a predicted battery demand profile;
    a system-to-cell converter arranged to receive the predicted battery demand profile and convert the battery demand profile to a cell-level operating profile;
    a remaining useful life estimator arranged to receive the cell-level operating profile and generate a remaining useful life of the battery estimate based on the cell-level operating profile; and
    a state of health profile generator arranged to generate the predicted state of health profile of the battery based on based on the remaining useful life of the battery estimate;
        wherein the system control module causes a vehicle performance manager to issue a command to the vehicle to modify a powertrain performance characteristic of the vehicle in dependence on the predicted state of health profile.

2. The system control module according to claim 1, wherein the predicted state of health system further comprises a database which stores the historical vehicle driving information.

3. The system control module according to claim 2, wherein the predicted state of health system further comprises a communications module arranged to receive vehicle driving information from the vehicle and to store the vehicle driving information in the database.

4. The system control module according to claim 3, wherein the vehicle is a vehicle in a fleet of vehicles and the communications module is arranged to receive vehicle driving information from a plurality of vehicles in the fleet of vehicles.

5. The system control module according to claim 1, wherein the historical vehicle driving information comprises at least one of: vehicle speed; environmental data; traffic data; road grade data; charging data; state of charge data; state of health data; and vehicle driver information.

6. The system control module according to claim 1, wherein the vehicle route profile generator is arranged to generate the vehicle specific route profile based further on predicted route characteristics.

7. The system according to claim 1, wherein the powertrain performance characteristic comprises at least one of: dynamic vehicle acceleration management; limiting acceleration when vehicle speed is above a threshold; limiting maximum speed; limiting charging power during regenerative energy recovery; and limiting accessories power consumption.

8. The system according to claim 1, wherein the vehicle performance manager is arranged to issue a command to the vehicle to modify a charging characteristic of the battery in dependence on the predicted state of health profile.

9. The system according to claim 8, wherein the charging characteristic comprises at least one of: limiting a charging rate of the battery; limiting a maximum state of charge of the battery; and limiting fast charging of the battery.

10. The system according to claim 1, wherein the vehicle is a vehicle in a fleet of vehicles and the system further comprises a fleet scheduling module arranged to generate fleet scheduling commands based on the predicted state of health profile for each of a plurality of vehicles in the fleet of vehicles.

11. The system according to claim 10, wherein the fleet scheduling module is arranged to compare the predicted state of health profiles for the plurality of vehicles in the fleet of vehicles and to determine which vehicles have batteries with a low predicted state of health in comparison to other vehicles in the fleet of vehicles.

12. The system according to claim 11, wherein the scheduling commands comprise at least one of: prioritize vehicles with batteries with a high predicted state of health; schedule vehicles with batteries with a low predicted state of health to avoid operating under harsh ambient conditions; and schedule vehicles with batteries with a low predicted state of health to avoid operating on demanding routes, wherein demanding routes comprises routes with a large number of hills or long distances.

13. The system according to claim 1, wherein the state of health profile generator is arranged to receive a battery capacity measurement from the vehicle and to extrapolate the state of health of the battery based on the received battery capacity measurement.

14. A fleet management system for managing a fleet of vehicles, the fleet management system comprising:
    a database which stores historical vehicle driving information of a plurality of vehicles in the fleet of vehicles;
    a vehicle route profile generator arranged to generate a vehicle specific route profile based on historical vehicle driving information;
    a powertrain model arranged to convert the vehicle specific route profile to a predicted battery demand profile;

a system-to-cell converter arranged to receive the predicted battery demand profile and convert the battery demand profile to a cell-level operating profile;

a remaining useful life estimator arranged to receive the cell-level operating profile and generate a remaining useful life of the battery estimate based on the cell-level operating profile;

a state of health profile generator arranged to generate a predicted state of health profile of a battery of a vehicle in the fleet of vehicles based on the the remaining useful life of the battery estimate; and a fleet scheduling module arranged to generate fleet scheduling commands based on a predicted state of health profile for each of the plurality of vehicles in the fleet of vehicles.

15. A method of predicting a state of health of a battery in a powertrain of a vehicle and modifying a powertrain performance to extend the life of the battery using the predicted state of health of the battery, the method comprising:

using historical vehicle driving information to generate a vehicle specific route profile;

converting the vehicle specific route profile to a predicted battery demand profile using a powertrain model;

converting the predicted battery profile into a cell-level operating profile;

estimating a remaining useful life of the battery based on the cell-level operating profile;

generating a predicted state of health profile of the battery based on the remaining useful life of the battery; and generating a command to modify an operation of the vehicle based on the predicted battery demand profile to extend the life of the battery;

wherein the command causes a vehicle performance manager to modify a powertrain performance characteristic of the vehicle in dependence on the predicted battery demand profile.

* * * * *